May 24, 1932.    F. M. PRATT    1,859,750
INDICATING DEVICE
Filed March 18, 1931    2 Sheets-Sheet 1
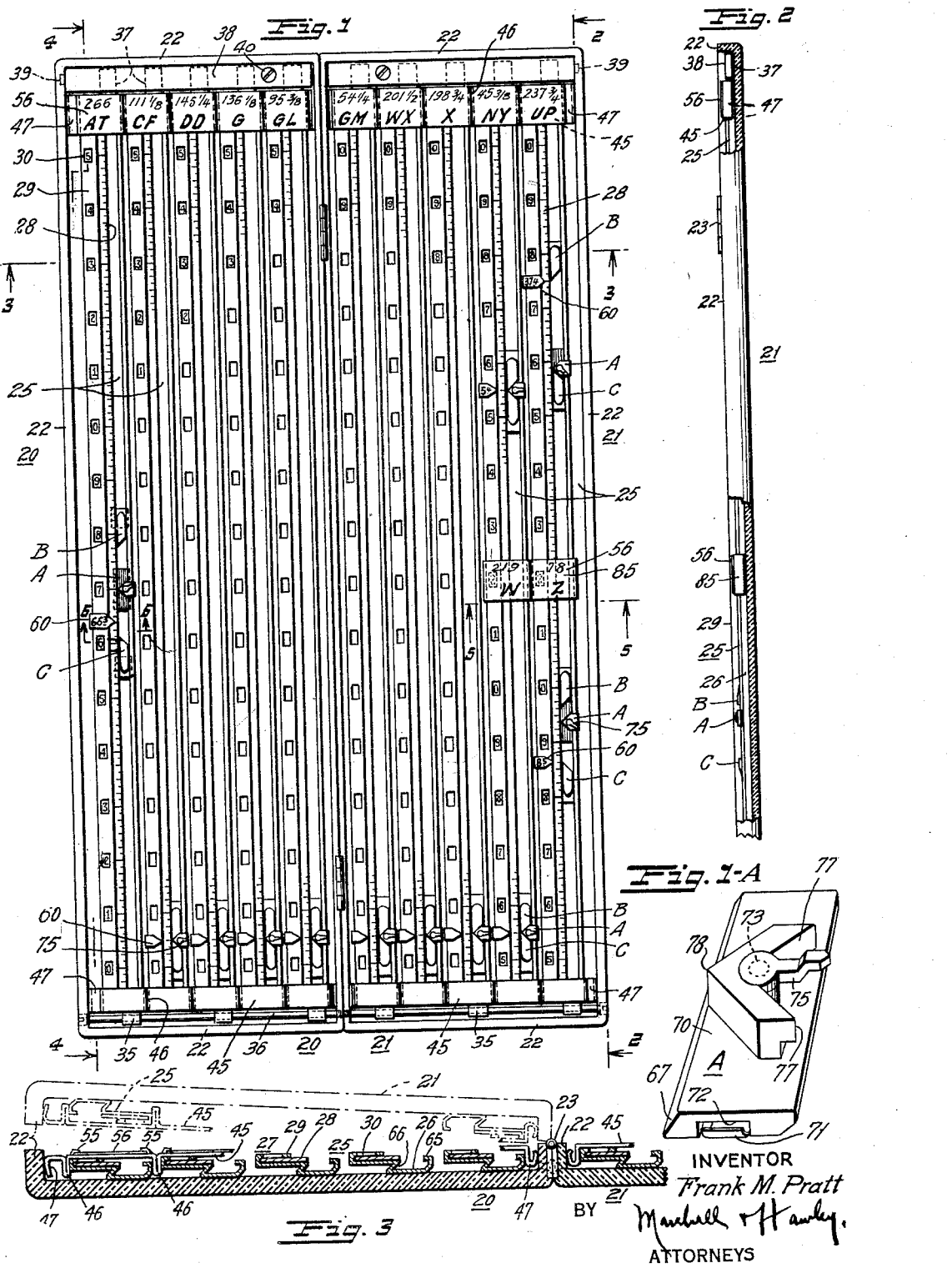
INVENTOR
Frank M. Pratt
BY Marshall & Hawley
ATTORNEYS May 24, 1932.    F. M. PRATT    1,859,750
INDICATING DEVICE
Filed March 18, 1931    2 Sheets-Sheet 2
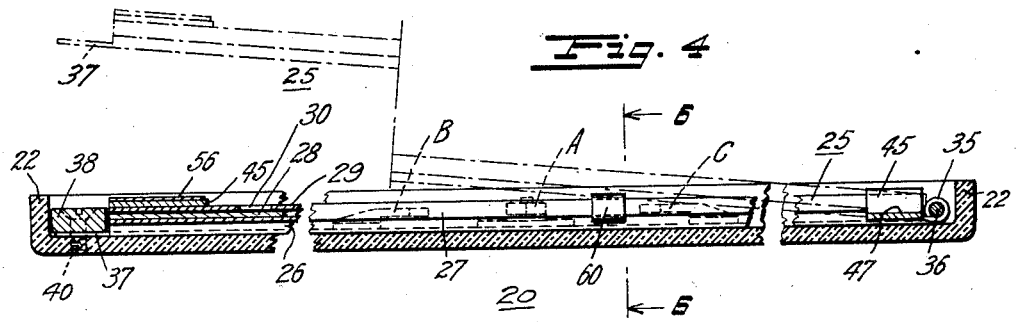
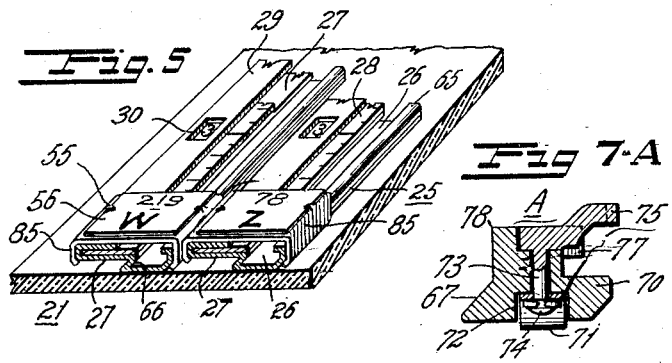
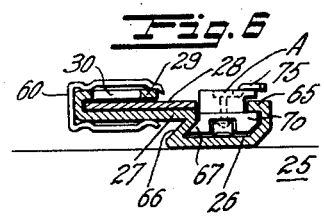
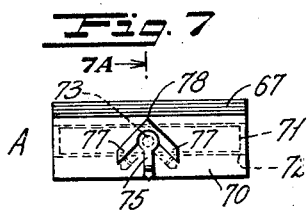
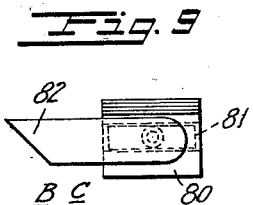
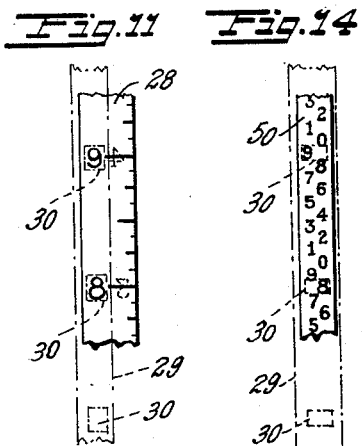
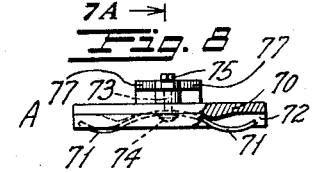
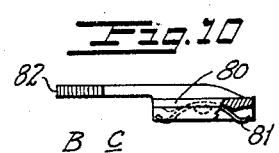
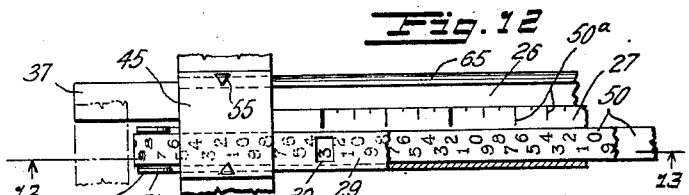
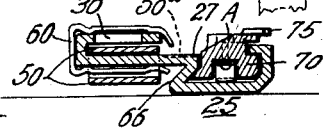
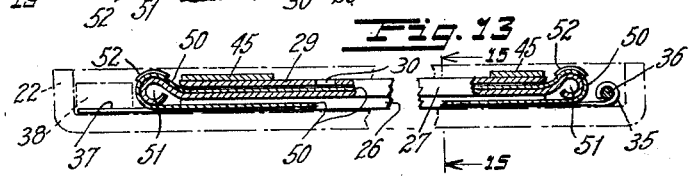
INVENTOR
Frank M. Pratt
BY Marshall & Hawley
ATTORNEYS Patented May 24, 1932

1,859,750

UNITED STATES PATENT OFFICE

FRANK M. PRATT, OF NEW YORK, N. Y.

INDICATING DEVICE

Application filed March 18, 1931. Serial No. 523,506.

This invention relates to a device for indicating fluctuating values and particularly to a device adapted for use in indicating fluctuating stock quotations.

The invention has for its salient object to provide a device of the character described, so constructed and arranged that the indicating means can be easily and quickly adjusted as the stock fluctuates and will indicate at a glance the following readings, namely, previous day's closing, opening, high, low, and present values.

Another object of the invention is to provide a device of the character described, so constructed and arranged that in addition to indicating the opening, high, low and present prices, it will show whether the latest trend is upwardly or downwardly.

Another object of the invention is to provide a device of the character described that is simple and compact in construction and will impart a maximum amount of information in a minimum amount of space.

Another object of the invention is to provide a device of the character described, so constructed and arranged that the scales of measurement can be easily and quickly adjusted and changed to suit conditions, thus providing great flexibility in the use of the device.

Further objects of the invention will appear from the following specification taken in connection with the drawings which form a part of this application, and in which Fig. 1 is a plan view of a device constructed in accordance with the invention;

Fig. 1A is a perspective view showing the marker or indicator used for indicating the latest or present stock quotation;

Fig. 2 is a view partly in section and partly in elevation taken substantially on line 2—2 of Fig. 1;

Fig. 3 is a transverse sectional elevation on an enlarged scale, partly broken away, and taken substantially on line 3—3 of Fig. 1;

Fig. 4 is a longitudinal sectional elevation taken substantially on line 4—4 of Fig. 1;

Fig. 5 is a perspective view, partly in section, taken on line 5—5 of Fig. 1;

Fig. 6 is a detail sectional elevation taken substantially on line 6—6 of Fig. 1;

Fig. 7 is a plan view of the device shown in Fig. 1A;

Fig. 7A is a transverse sectional elevation on an enlarged scale taken substantially on line 7A—7A of Fig. 7;

Fig. 8 is a rear elevation, partly in section, of the device shown in Fig. 7;

Fig. 9 is a plan view of the marker adapted to designate the high reading on the scale;

Fig. 10 is an elevational view, partly in section, taken at right angles to Fig. 9;

Fig. 11 is a plan view illustrating one construction of scale adapted for use in the device;

Fig. 12 is a plan view, partly broken away, showing another type of measuring scale adapted for use in the device;

Fig. 13 is a sectional elevation taken substantially on line 13—13 of Fig. 12;

Fig. 14 is an elevational view similar to Fig. 11 but showing the use of a strip such as that shown in Figs. 12 and 13; and Fig. 15 is a sectional elevation on an enlarged scale taken substantially on line 15—15 of Fig. 13 and showing particularly the location of the endless scale strip.

The invention briefly described consists of a device comprising a board or plate on which are mounted a plurality of guideways, each guideway having a scale or measuring strip adjacent thereto. Adjustable means are mounted in the guideway and adjacent the scale for designating on the scale the following readings, namely, the opening, high, low, and latest or present reading, and also for indicating the trend of the market, that is, whether the latest quotations indicate an upward or downward trend. The designating means are so relatively constructed and arranged that the high and low markers can indicate the same point on the scale as the marker which is used to designate the latest and present reading. This is important since when the market opens these three indicating means should all designate the opening point. As the market rises the marker for indicating the latest reading is moved upwardly, carrying with it the marker for indicating the high reading. If the next quotation is down, the intermediate marker which indicates the latest reading is moved downwardly and means is carried thereby for showing the downward trend of the market.

The device is therefore so constructed as to show at a glance the opening quotation, the high and low readings, and present or latest quotation and the trend of the market.

The device, furthermore, may have a movable or adjustable scale for each guideway, the scales being so designed as to provide a wide range of readings, thus giving great flexibility to the use of the device.

Further details of the invention will appear from the following description.

In the particular embodiment of the invention illustrated, a folding device is shown comprising a pair of sections 20 and 21, each section having an upwardly extending annular flange 22. The sections are hinged together, as shown at 23.

A plurality of longitudinally extending strips 25 are provided, each strip having a longitudinal guideway portion 26 and a portion 27 parallel to the portion 26 and elevated slightly with respect thereto. The portion 27 is adapted to receive a graduated strip or scale 28 which is disposed beneath an overlying flange 29 having openings 30 therein adapted to expose scale readings on the strip 28 in the manner hereinafter described.

Certain of the strips 25 are extended as shown at 35 to form loops which are pivoted on pintles 36 removably carried between the side flanges 22. Each strip is furthermore provided at its opposite end with an extension 37 adapted to be positioned beneath a retaining strip 38 which is provided at one end with a lug 39 adapted to be disposed in a recess in the outer flange 22 and is held in any suitable manner, as by a screw 40. In order to retain the strips 25 in position in the frame, a retaining member or clip 45 is provided at each end of the strips. Each of the clips 45 is provided with offset portions 46 adapted to extend between adjacent strips and is provided at its ends with resilient friction flanges or loops 47 adapted to engage the inner surface of the flanges 22 at the opposite sides of the sections and to frictionally hold the strips in position.

The graduated scale strips may be subdivided in any desired manner, and in Fig. 11 a strip 28 is shown having the units of measurement divided into eighths. The flange 29 has its openings 30 so spaced as to expose successive units of measurement, such as 8, 9. The strip 28 can be adjusted beneath the flange 29 so as to expose to view any desired portion of the scale in accordance with the requirements necessary to indicate the reading of the quotations of any particular stock.

In Figs. 12 and 14 a strip 50 is shown having numerals thereon successively staggered and so arranged as to provide between successive openings 30 in the flange 29, a range of readings from 0 to 11. This strip 50 may take the form of an endless strip, as shown in Fig. 13, in which case the ends of the portion 27 of each of the strips may be extended and bent to form a strip guiding tongue 51. A curved lug 52 may be positioned above the strip so that the strip will be guided between the lugs and the curved tongues 51. In Figs. 12, 13 and 15, the graduations 50$^a$ are formed on the exposed portion of member 27.

When the strip shown in Figs. 12 and 14 is used, by shifting the strip longitudinally one-eleventh of the distance between the openings 30 in flange 29, the readings through consecutive openings will be changed one whole point, whereas, with the strip shown in Fig. 11, in order to obtain a change in readings through the openings, it is necessary to shift the strip in one direction or the other an extent equal to the distance between the openings. However, in order to provide flexibility with the strip shown in Fig. 11, the scale is printed on both sides of the strip, with different digits on one side from those on the other. In this way, by reversing the strip, different readings can be shown.

It will also be noted that the strip shown in Figs. 12 and 14 has a complete scale ranging from 0 to 11 beneath each two consecutive openings 30 in the flange 29.

The clips 45 which are integral with strips 25 may be formed of any suitable material and those at the top of the panels or sections are preferably provided with lugs 55 struck up therefrom and adapted to receive and retain tabs 56. These tabs are adapted to receive suitable indicia for indicating the stock on which quotations are given and the reading at the close of the previous day's business. For instance, in Fig. 1 the left hand column indicates readings on a stock designated AT and the closing quotation for the previous day was 266.

Each strip is provided with a clip 60 which is adapted to grip the portion 27 and flange 29, as shown in Fig. 6. The clip 60 is used to designate on the scale the opening reading for the day. In the left hand column in Fig. 1 the stock designated AT closed on the preceding day at 266 and opened at 266⅜.

In order to designate for each stock quoted on the board, the high, low and latest or present readings, three markers or indicating means are positioned in each of the guideways 26. These markers or indicating means are designated as A, B and C. The guideway 26 has an overhanging flange 65 and an inclined wall 66. The marker A is mounted in the guideway and is provided with an inclined edge portion 67 adapted to engage beneath the wall 66 and with a laterally extending portion 70 adapted to be positioned beneath the flange 65. A curved spring 71 is mounted in a recess 72 formed in the under surface of the marker A and is held by a pin 73 having a head 74 on its lower end and an arm 75 on its upper end. The spring in conjunction with the surface 67 and projecting portion 70 of the marker holds the marker in any adjusted position. The spring also serves to hold the arm 75 in any position of adjustment thereof. The arm 75, as shown particularly in Fig. 1A, is offset at its outer end and is adapted to swing between angularly disposed arms 77 which come to a point at 78, the point being used to designate the scale reading.

The construction of the index pointers or markers B and C is particularly shown in Figs. 9 and 10. Each of these devices consists of a block 80 having portions adapted to fit within the guideway 26 and having a spring 81 for frictionally retaining the marker in adjusted position. Each of these members also has a beveled pointer 82, the marker B being beveled in one direction and the marker C being beveled in the opposite direction. From the showing in Fig. 10 it will be seen that the beveled outer edges of the pointers 82 are elevated above the block 80 and are thus adapted to move over the upper surface of block 70. The pointers 82, as shown in Fig. 1, are so inclined as to fit against the outer edges of the central index or marker device A. Thus, when the market opens, the marker A will indicate the opening quotation and the markers B and C will be positioned in engagement with the marker A, as shown in the column headed by NY. In this position the blocks 70 and 80 abut.

If desired, the columns formed by the strips 25 may be sub-divided, as shown at the right in Fig. 1, where the upper portions of the two right hand columns indicate the market condition as to the stocks NY and UP and the lower portions of these same columns indicate the conditions of stocks W and Z. This is accomplished by means of a pair of clips 85 shown in detail in Fig. 5.

In order to enable the observer to tell at a glance whether the trend of the market is upward or downward, it is preferable to so arrange the scales that the clips or markers 60 which show the opening quotations be arranged in substantial alinement across the plurality of columns. This can easily be done by shifting the scale strips longitudinally in the strip guides to positions in which the opening values indicated on the scales will be positioned in substantial horizontal alinement.

It will be obvious that the market condition with respect to any particular stock can be told at a glance from inspection of the column in which the stock is listed. As an example, the stock AT closed at 266 the previous day, as shown at the top of the column, opened at 266⅜, as shown by the marker 60, the low point being 266⅛, as indicated by marker C, the high point being 267⅝, as shown by the marker B, and the present reading being 267, as shown by marker A. The arm 75 carried by the marker A is inclined upwardly, showing that the last reading indicated an upward trend on this stock. Turning to the stock NY, this stock closed on the previous day at 45⅜, opened at 45⁴/₈, and has not changed since the opening. Stock UP closed on the previous day at 237¾ opened at 237⁴/₈, this reading also being the high reading, the present reading coinciding with the low reading at 235⅞, the trend on this stock being downwardly.

An indicating board, such as that above described, has many uses. It may be used in brokers' offices as a wall board or it may be used to record readings from the ticker tape of stocks not listed on the main board. Also, it will be particularly useful for business men having dealings on the market since they can send their messengers to the broker's office to take readings of stocks in which they are interested and the market conditions can be easily and quickly indicated by means of the adjustable indicators or markers. Attention is particularly directed to the fact that the readings can be taken directly from the columns by observing the positions of the markers, no additions to or subtractions from previous readings being necessary.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. An indicating device comprising a guideway having a scale for showing increments in price fluctuations, a movable tab mounted on the scale for indicating on the scale the opening price, and three slides in said guideway for indicating respectively the high, low and present or last prices, said slides having pointers movable in a path independent of the path of movement of the tab.

2. An indicating device comprising a guideway having a scale for showing increments in price fluctuations, a movable tab for indicating on the scale the opening price, and three slides in said guideway for indicating respectively the high, low and present or last prices, said slides having pointers so relatively constructed and arranged that all three can indicate a common point on the scale.

3. An indicating device comprising a guideway having a scale for showing increments in price fluctuations, a movable tab for indicating on the scale the opening price, and three slides in said guideway for indicating respectively the high, low and present or last prices, the slide for indicating the present or last price having means on the portion in front of the guideway for indicating whether the latest trend of the market is up or down.

4. An indicating device comprising a guideway having a scale for showing increments in price fluctuations, a movable tab mounted on the scale for indicating on the scale the opening price, three slides in said guideway movable independently of the tab and in a path spaced from the path of movement thereof for indicating respectively the high, low and present or last prices, and means outside of the guideway and on the front of one of the slides for indicating the latest trend of the market.

5. An indicating device comprising a guideway having a scale for showing increments in price fluctuations, a movable tab at one edge of the scale for indicating on the scale the opening price, and three slides in said guideway for indicating respectively the high, low and present or last prices, the slide for indicating the present or last price having movable means on the front thereof for indicating whether the latest trend of the market is up or down.

6. An indicating device comprising a member having a guideway and having a scale for showing increments in price fluctuations, a movable tab on said member having a pointer for indicating on the scale the opening price, three slides in said guideway having pointers for indicating respectively the high, low and present or last prices, the pointer on the tab being movable in a path spaced from the path of movement of the slide pointers, and movable means for indicating the latest trend of the market.

7. An indicating device comprising a guideway having an adjustable scale for showing increments in price fluctuations, a movable tab for indicating on the scale the opening price, and three slides in said guideway having pointers for indicating respectively the high, low and present or last prices, said pointers being arranged to indicate a common point on the scale in one position of adjustment.

8. An indicating device comprising a guideway having a scale for showing increments in price fluctuations, a movable tab at one edge of the scale for indicating on the scale the opening price, and three slides in said guideway having pointers for indicating respectively the high, low and present or last prices, said pointers being arranged to indicate a common point on the scale in one position of adjustment.

9. An indicating device comprising a graduated scale adapted to show increments in price fluctuations, a tab movable relative to said scale and having a pointed portion adapted to indicate selected points thereon, and means carried by the tab for indicating the last direction of movement thereof.

10. An indicating device comprising a strip having a scale supporting portion and a guideway, adjustable indicating means in said guideway, and longitudinally adjustable graduated scale strip on said scale supporting portion.

11. An indicating device comprising a guideway, a scale graduated to show increments in price fluctuations, a movable marker having a pointed portion for indicating on the scale a price quotation of a stock, and means carried by said marker for indicating the market trend of said stock.

12. An indicating device comprising a guideway, a scale graduated to show increments in price fluctuations, a movable marker having a pointed portion for indicating on the scale a price quotation of a stock, and an arm carried by said marker for indicating the market trend of said stock.

13. An indicating device comprising a guideway, a scale graduated to show increments in price fluctuations, a movable marker having a pointed portion for indicating on the scale a price quotation of a stock, and an arm pivoted on said marker for indicating the market trend of said stock.

14. In an indicating device, a supporting member, a plurality of strips mounted thereon, movable means for holding said strips in position, a graduated scale on each strip, and means carried by each strip for indicating a plurality of readings on the scale carried thereby.

15. In an indicating device, a supporting member, a plurality of strips pivotally mounted thereon, movable means for holding said strips in position, a graduated scale on each strip, and means carried by each strip for indicating a plurality of readings on the scale carried thereby.

16. An indicating device comprising a pair of hingedly connected covers, each having an annular flange, scale strips mounted in each cover and below the planes of the outer edges of said flanges, and markers associated with said strips.

17. An indicating device comprising a graduated scale strip, a clip for sub-dividing said strip, and adjustable markers associated with said strips and disposed on opposite sides of said clip.

18. An indicating device comprising a supporting member having graduations thereon, a scale strip adjustable relative to said member and having scale marks spaced to correspond to the graduations on said member, and adjustable means for designating predetermined values on said member and strip.

19. In an indicating device, an elongated strip having a longitudinal guideway and a support adjacent said guideway for a scale strip, said support having means at each end thereof for guiding said scale strip, and an endless scale strip mounted on said support.

FRANK M. PRATT.